United States Patent
Pak et al.

(10) Patent No.: US 12,184,966 B2
(45) Date of Patent: Dec. 31, 2024

(54) METHOD AND ELECTRONIC DEVICE FOR PHOTOGRAPHING OBJECT FOR IDENTIFICATION OF COMPANION ANIMAL

(71) Applicant: PETNOW INC., Daejeon (KR)

(72) Inventors: Dae Hyun Pak, Seoul (KR); Joon Ho Lim, Seoul (KR)

(73) Assignee: PETNOW INC., Daejeon (KR)

( * ) Notice: Subject to any disclaimer, the term of this patent is extended or adjusted under 35 U.S.C. 154(b) by 0 days.

(21) Appl. No.: 17/915,472

(22) PCT Filed: Jun. 27, 2022

(86) PCT No.: PCT/KR2022/009094
§ 371 (c)(1),
(2) Date: Sep. 28, 2022

(87) PCT Pub. No.: WO2023/277472
PCT Pub. Date: Jan. 5, 2023

(65) Prior Publication Data
US 2024/0214670 A1    Jun. 27, 2024

(30) Foreign Application Priority Data

Jun. 28, 2021   (KR) .................. 10-2021-0083752

(51) Int. Cl.
*H04N 23/60*    (2023.01)
*G06V 40/10*    (2022.01)
(Continued)

(52) U.S. Cl.
CPC ............ *H04N 23/64* (2023.01); *G06V 40/10* (2022.01); *G06V 40/50* (2022.01); *H04N 23/61* (2023.01); *H04N 23/633* (2023.01); *H04N 23/67* (2023.01)

(58) Field of Classification Search
CPC ...... H04N 23/64; H04N 23/61; H04N 23/633; H04N 23/67; G06V 40/10; G06V 40/50
See application file for complete search history.

(56) References Cited

U.S. PATENT DOCUMENTS

| | | | |
|---|---|---|---|
| 2004/0153477 A1* | 8/2004 | Meadows | G06Q 10/10 |
| 2013/0069978 A1* | 3/2013 | Tanaka | G06V 40/10 |
| | | | 382/110 |

(Continued)

FOREIGN PATENT DOCUMENTS

| | | |
|---|---|---|
| JP | 2010-136221 | 6/2010 |
| KR | 10-2019-0059148 | 5/2019 |

(Continued)

OTHER PUBLICATIONS

PCT ISR.
(Continued)

*Primary Examiner* — Gevell V Selby

(57) ABSTRACT

A method and electronic device capable of improving image quality of an object for identification of a companion animal is proposed. The method for photographing the object for the identification of the companion animal includes obtaining an image including the companion animal, detecting the object for the identification of the companion animal from the image, and photographing a next image in a state in which a focus is set to a location of the detected object. The method and electronic device ensures that the object for the identification of the companion animal is detected in the photographed image and the focus is continuously placed on the location of the corresponding object, so that the image of the object for the identification having sharper quality is obtained, whereby images of the objects for the identification of the companion animals and usable for artificial intelligence-based learning or identification may be accumulated.

18 Claims, 16 Drawing Sheets

(51) Int. Cl.
*G06V 40/50* (2022.01)
*H04N 23/61* (2023.01)
*H04N 23/63* (2023.01)
*H04N 23/67* (2023.01)

(56) References Cited

U.S. PATENT DOCUMENTS

2021/0202092 A1* 7/2021 Wallack ................. A61B 5/055
2021/0321034 A1* 10/2021 Okamoto ............. H04N 23/611

FOREIGN PATENT DOCUMENTS

KR 10-2020-0044209 4/2020
KR 10-2021-0074017 6/2021

OTHER PUBLICATIONS

Animal Administration System Using Nose-Print Recognition and Blockchain Network, Cho, Ji-Yeon & Lee, Seongsoo, Dec. 31, 2019 (j.inst.Korean.electr.electron.eng.vol.23,No. 4, 1477~1480, Dec. 2019).

* cited by examiner

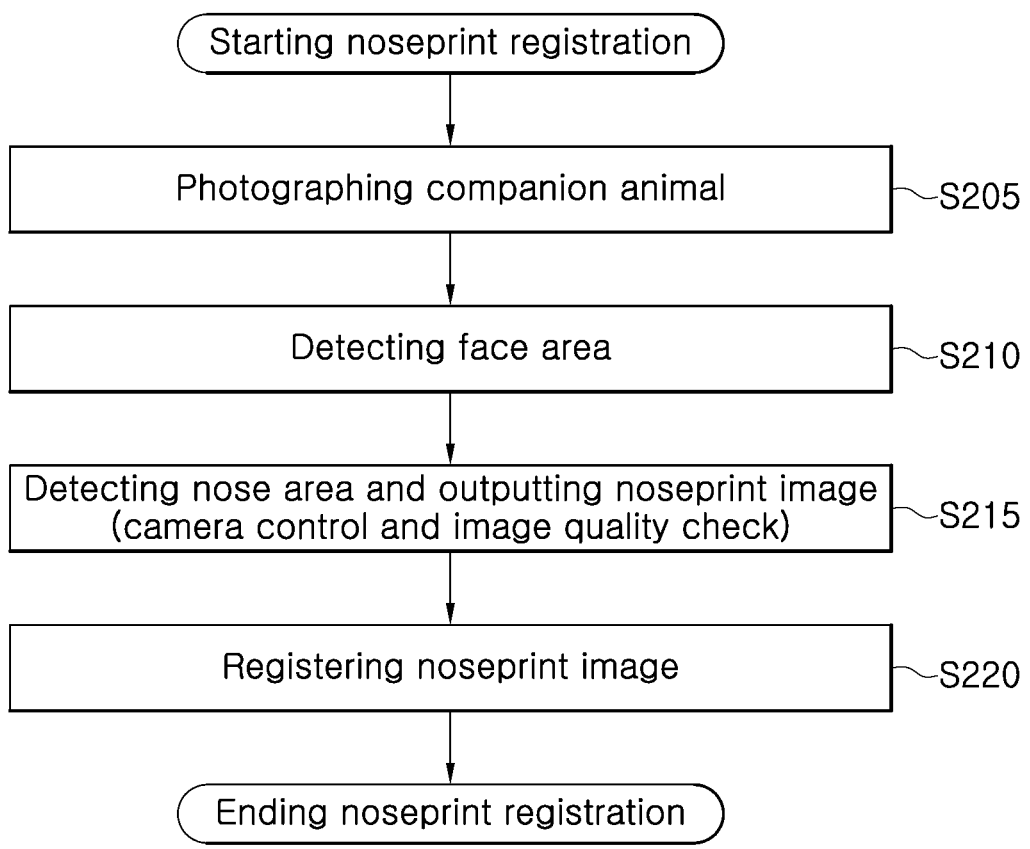

METHOD AND ELECTRONIC DEVICE FOR PHOTOGRAPHING OBJECT FOR IDENTIFICATION OF COMPANION ANIMAL

TECHNICAL FIELD

The present disclosure relates to a method and electronic device for photographing an object for identification of a companion animal and, more particularly, to a method and electronic device for obtaining an image of an object for identification of a companion animal, the image being suitable for artificial intelligence-based learning or identification.

BACKGROUND ART

In modern society, demand for companion animals living with people and on which people may rely emotionally is increasing. Accordingly, there is a growing need to manage information on various companion animals in a database for health management, etc. of companion animals. In order to manage the companion animals, identification information, similar to human fingerprints, of the companion animals is required, and an object that may be used according to each of the companion animals may be individually defined. For example, in a case of dogs, since nose prints (i.e., shapes of nose creases) of the dogs are different from each other, a nose print for each dog may be used as the identification information.

As shown in FIG. 1A, a method of registering a nose print is performed by step S110 of photographing a face including a nose of a companion animal, similar to registering a fingerprint or a face of a person, and step S120 of storing and registering an image including a nose print in a database. In addition, as shown in FIG. 1B, a method of retrieving the nose print may be performed by step S130 of photographing the nose print of the companion animal, step S140 of searching for the nose print matching a photographed nose print and information related to the nose print, and step S150 of outputting information matching the photographed nose print. As shown in FIGS. 1A and 1B, through the processes of registering and retrieving the nose print of the companion animal, each companion animal may be identified and information of the corresponding companion animal may be managed. The nose print information of the companion animal is stored in the database and may be used as data for AI-based learning or identification.

However, several problems exist in obtaining and storing the nose print of the companion animal.

First, photos may be difficult to be recognized depending on angles, focuses, distances, sizes, environments, etc. of photographing. There have been attempts to apply human facial recognition technology to nose print recognition. However, whereas sufficient data is accumulated for facial information of people, sufficient data is not secured for nose print information of companion animals, thereby resulting in a problem of having a low recognition rate. Specifically, in order to perform AI-based recognition, learning data processed in a format that may be learned by a machine is required, but the nose prints of companion animals are difficult to be recognized because the sufficient data is not accumulated.

In addition, an image with clear nose creases is required for nose print recognition of a companion animal, but unlike people, the companion animal does not know how to perform an action such as stopping its motion for a photograph for a while, so it is difficult to obtain the image of the clear nose creases. For example, it is very difficult to obtain a nose print image having a desired quality because a dog constantly moves the face thereof and sticks out the tongue thereof. For example, in order to recognize a nose print, the image in which the nose creases is clearly photographed is required, but in most of the actually photographed images, the nose prints are not clearly photographed due to shaking and the like in many cases. In order to solve such a problem, a method of photographing an image with a dog's nose forcibly fixed is being considered, but such a method is considered inappropriate because of forcing a companion animal to perform a forced action.

DISCLOSURE

Technical Problem

The present disclosure provides a method and electronic device capable of improving an image quality of an object for identification of a companion animal.

The problems to be solved of the present disclosure are not limited to those mentioned above, and other problems not mentioned will be clearly understood by those skilled in the art from the following description.

Technical Solution

According to the present disclosure, a method for photographing an object for identification of a companion animal includes: obtaining an image including the companion animal; detecting the object for the identification of the companion animal from the image; and photographing a next image in a state in which a focus is set to a location of the detected object.

According to the present disclosure, the obtaining of the image including the companion animal may include generating the image by photographing the companion animal in the state in which the focus is set on the location of the object detected from the image photographed in a previous frame.

According to the present disclosure, the detecting of the object for the identification of the companion animal from the image may include: setting a first feature area for determining a species of the companion animal in the image; and setting a second feature area including the object for the identification of the companion animal according to the species of the companion animal within the first feature area.

According to the present disclosure, the setting of the second feature area may include determining whether the image of the object for the identification of the companion animal is suitable for artificial intelligence-based learning or identification.

According to the present disclosure, the determining of whether the image of the object is suitable for the artificial intelligence-based learning or identification may include: determining whether a quality of the image of the object satisfies a reference condition; transmitting the image of the object to a server when the quality satisfies the reference condition; and discarding the image of the object and performing photographing for the next image when the quality does not satisfy the reference condition.

According to the present disclosure, a method for photographing an object for identification of a companion animal includes: obtaining an image including the companion animal; detecting the object for the identification of the companion animal from the image; setting a focus to the detected object; and outputting the image in which graphic elements indicating object detection states are overlaid on a location of the object on which the focus is set.

According to the present disclosure, the outputting of the image may include: determining whether a quality of the image of the object satisfies a reference condition; overlaying a first graphic element indicating a state of having a good quality on the object when the quality of the image of the object satisfies the reference condition; and overlaying a second graphic element indicating a state of having a poor quality on the object when the quality of the object does not satisfy the reference condition.

According to the present disclosure, the outputting of the image may include outputting score information indicating a photographing quality state of the object in the image.

According to the present disclosure, the method for photographing the object for the identification of the companion animal may further include: providing feedback to a user so as to enable a good quality object image to be photographed according to the quality states of the image of the object.

According to the present disclosure, the obtaining of the image including the companion animal may include generating the image by photographing the companion animal in a state in which the focus is set on the location of the object detected from the image photographed in a previous frame.

According to the present disclosure, an electronic device for photographing an object for identification of a companion animal includes: a camera configured to generate an original image including the companion animal; and a processor configured to detect the object for the identification of the companion animal from the image and control the camera so as to photograph a next image in a state in which a focus is set on a location of the detected object.

According to the present disclosure, the processor may control the camera, so as to generate the image by photographing the companion animal in the state in which the focus is set on the location of the object detected from the image photographed in a previous frame.

According to the present disclosure, the processor may set a first feature area for determining a species of the companion animal in the image, and set a second feature area including the object for the identification of the companion animal within the first feature area.

According to the present disclosure, the processor may determine whether the image of the object for the identification of the companion animal is suitable for artificial intelligence-based learning or identification.

According to the present disclosure, the processor may determine whether a quality of the image of the object satisfies a reference condition, and control the camera, so as to transmit the image of the object to a server when the quality satisfies the reference condition, and discard the image of the object and perform photographing for the next image when the quality does not satisfy the reference condition.

According to the present disclosure, the electronic device for photographing the object for the identification of the companion animal may further include a display configured to output the image of the companion animal being photographed.

According to the present disclosure, the processor may output, on the display, the image in which graphic elements indicating object detection states are overlaid on the location of the detected object.

According to the present disclosure, the processor may determine whether a quality of the image of the object satisfies a reference condition, overlay a first graphic element indicating a state of having a good quality on the object when the quality of the image of the object satisfies the reference condition, and overlay a second graphic element indicating a state of having a poor quality on the object when the quality of the object does not satisfy the reference condition.

According to the present disclosure, the processor may output score information indicating a photographing quality state of the object in the image on the display.

According to the present disclosure, the processor may provide feedback to a user so as to enable a good quality object image to be photographed according to the quality state of the image of the object.

Advantageous Effects

According to the present disclosure, the object for the identification of the companion animal is detected in the photographed image and the focus is continuously placed on the location of the corresponding object, so that the image of the object for the identification having sharper quality is obtained, whereby the images of the objects (i.e., the nose print images) for identification of the companion animals and usable for artificial intelligence-based learning or identification may be accumulated.

Effects of the present disclosure are not limited to those mentioned above, and other effects not mentioned will be clearly understood by those skilled in the art from the following description.

DESCRIPTION OF DRAWINGS

FIGS. 2A and 2B illustrate procedures for AI-based nose print management of the companion animal to which suitability determination of an object image for learning or identification according to the present disclosure is applied.

MODE FOR INVENTION

Figure 1A:
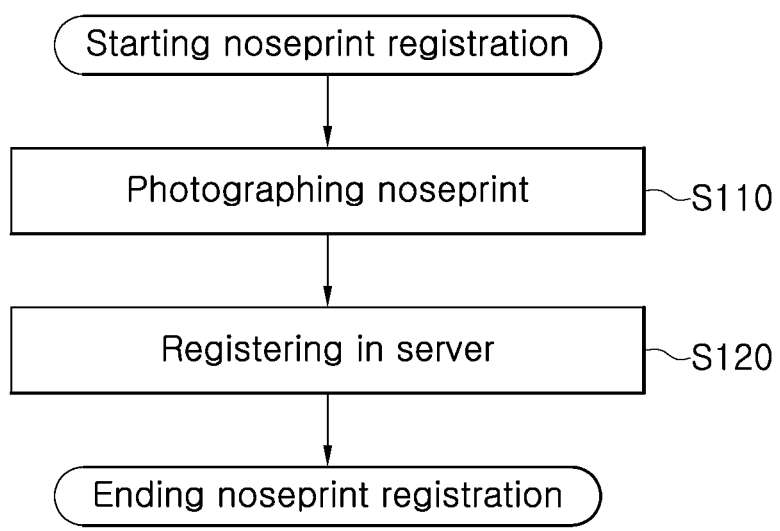
FIGS. 1A and 1B illustrate schematic procedures for AI-based management of a companion animal.
Figure 1B:
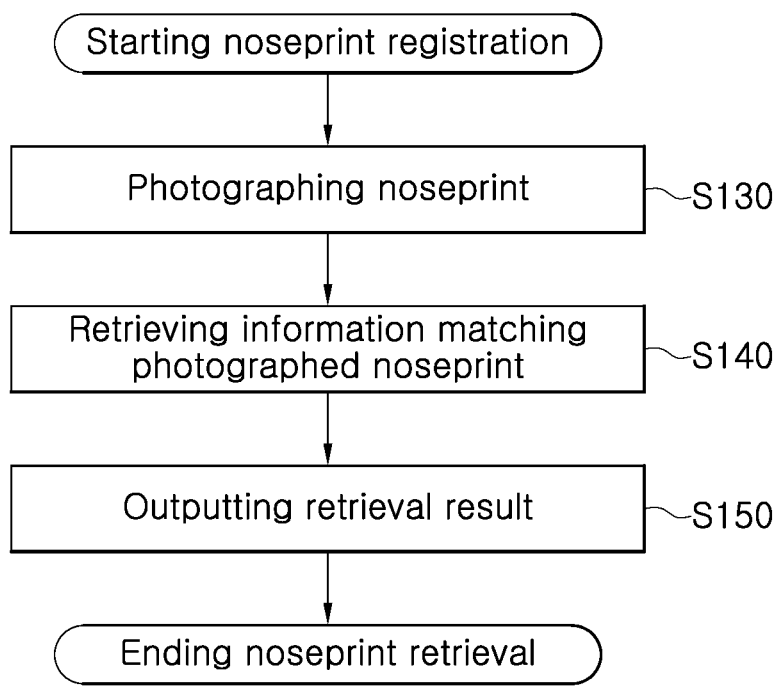

Hereinafter, exemplary embodiments of the present disclosure will be described in detail with reference to the accompanying drawings so that those skilled in the art can easily implement the present disclosure. The present disclosure is not limited to the exemplary embodiments described herein and may be embodied in many different forms.

In order to clearly describe the present disclosure, parts irrelevant to the description are omitted, and the same reference numerals designate the same or similar components throughout the specification.

In addition, in various exemplary embodiments, components having the same configuration will be described only in representative exemplary embodiments by using the same reference numerals, and in other exemplary embodiments, only configurations different from the representative exemplary embodiments will be described.

Throughout the specification, when a part is said to be "connected or coupled" to another part, an expression such as "connected or coupled" is intended to include not only "directly connected or directly coupled" but also "indirectly connected or indirectly coupled" having a different member in the middle thereof. In addition, when a part is said to "include" or "comprise" a certain component, it means that it may further include or comprise other components, except to exclude other components unless the context clearly indicates otherwise.

Unless otherwise defined, all terms including technical and scientific terms used herein have the same meaning as commonly understood by one of ordinary skill in the art to which the present disclosure belongs. It will be further understood that terms as defined in dictionaries commonly used herein should be interpreted as having a meaning that is consistent with their meaning in the context of this specification and the relevant art and will not be interpreted in an idealized or overly formal sense unless expressly so defined herein.

In the present document, descriptions will be focused on content in which identification information is extracted by using a shape of dog's nose creases (i.e., a nose print), but the scope of companion animals is not limited to dogs in the present disclosure. In addition, features used as the identification information are not limited to the nose print, and various physical features of the companion animals may be used.

As described above, since nose print images of companion animals suitable for AI-based learning or identification are not sufficiently secured and the nose print images of the companion animals are likely to be of low quality, it is necessary to selectively store the nose print images in the database for the AI-based learning or identification.

Figure 2B:
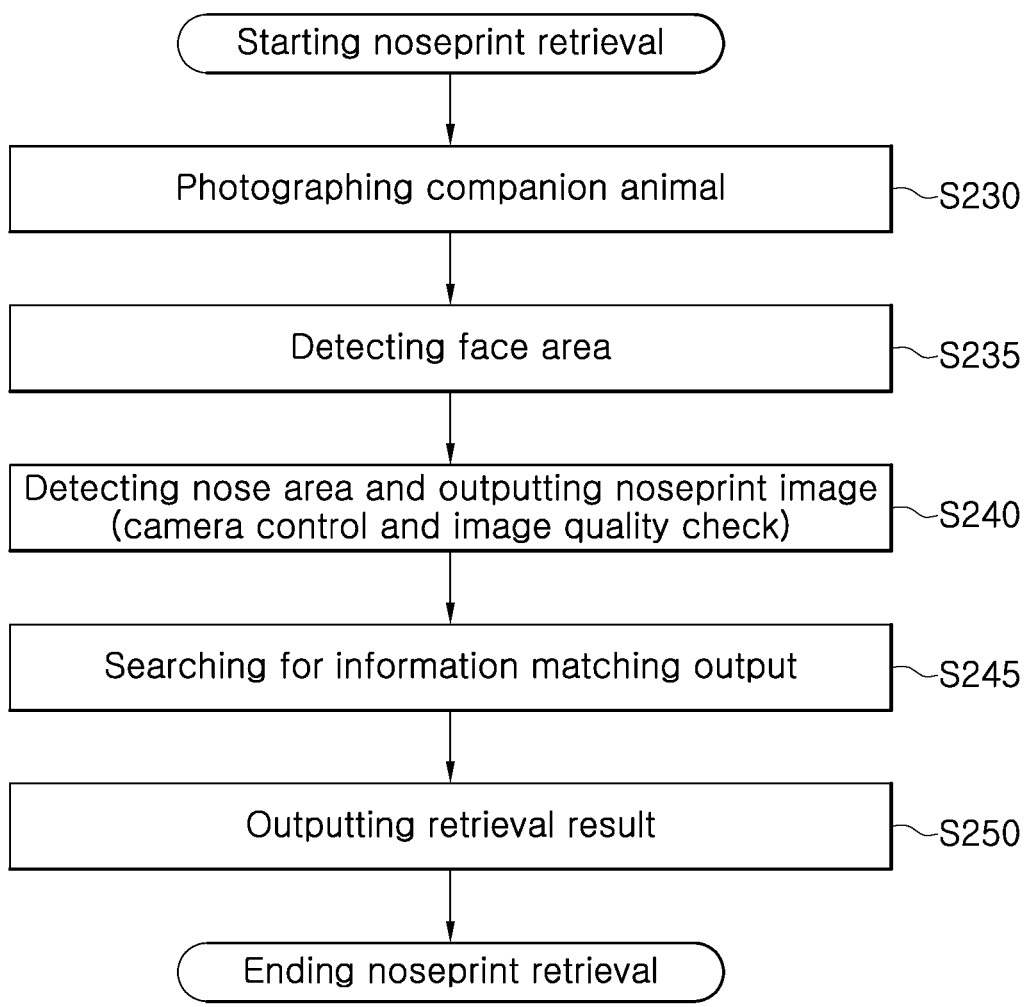

FIGS. 2A and 2B illustrates procedures for AI-based nose print management of the companion animal to which suitability determination of a nose print image for learning or identification according to the present disclosure is applied. After a nose print of a companion animal is photographed, the embodiment of the present disclosure first determines whether the photographed nose print image is suitable as data for AI-based learning or identification, and when the nose print image is determined to be suitable, the nose print image is transmitted to and stored in a server for the AI-based learning or recognition, thereby being used as the data for later learning or identification.

As shown in FIGS. 2A and 2B, a nose print management procedure according to the present disclosure largely includes a nose print obtaining procedure and a nose print recognizing procedure.

According to the present disclosure, when a nose print of a companion animal is newly registered, an image, in which the companion animal is included, is photographed and then a nose print image is extracted from a face area of the companion animal, and in particular, it is determined first whether the corresponding nose print image is suitable for identification or learning of the corresponding companion animal. When it is determined that the photographed image is suitable for the identification or learning, the corresponding image is transmitted to a server (i.e., an artificial intelligence neural network) and stored in a database.

Similarly, when identification information of a companion animal is retrieved by using a nose print, an image in which the companion animal is included is photographed and then a nose print image is extracted from a face area of the companion animal, and in particular, it is determined first whether the corresponding nose print image is suitable for the identification or learning of the corresponding companion animal. When it is determined that the photographed image is suitable for the identification or learning, the corresponding image is transmitted to the server and the identification information of the corresponding companion animal is extracted through matching with the previously stored nose print images.

As shown in FIG. 2A, the nose print registration procedure includes: step S205 of photographing an image of a companion animal; step S210 of first detecting a face area (hereinafter referred to as a first feature area) in the photographed image of the companion animal; step S215 of detecting an area (hereinafter referred to as a second feature area) occupied by the nose within the face area and outputting a nose print image through a quality check on whether the photographed image is suitable for learning or identification; and step S220 of transmitting the output image to a server constituting an artificial neural network so as to be stored and registered.

As shown in FIG. 2B, the nose print retrieval procedure includes: step S230 of photographing an image of a companion animal; step S235 of detecting a face area from the image of the companion animal; and step S240 of detecting an area occupied by the nose within the face area and outputting a nose print image through the quality check on whether the photographed image is suitable for the learning or identification. This nose print retrieval procedure is similar to the nose print registration procedure. Thereafter, step S245 of searching for matching information by comparing the output nose print image with the previously stored and learned nose print images and step S250 of outputting a search result are performed.

Figure 3:
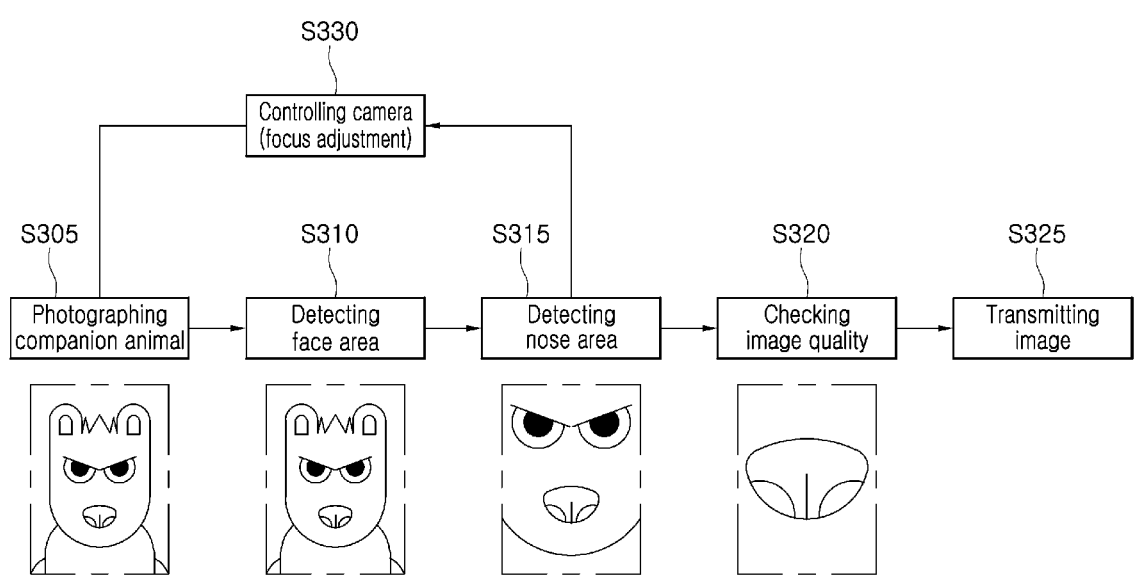
FIG. 3 illustrates a procedure for detecting an object for identification of the companion animal in a companion animal management system according to the present disclosure.

FIG. 3 illustrates a procedure for detecting an object corresponding to the nose of a companion animal in the companion animal nose print management system according to the present disclosure.

Referring to FIG. 3, step S305 of generating an initial image by first photographing the companion animal, and then step S310 of detecting a face area from the initial image is performed. Thereafter, step S315 of detecting a nose area within the face area in consideration of a species of the companion animal is performed. The reason why the face area is first detected and the nose area is secondarily detected is that cascaded detection may reduce computational complexity and improve detection accuracy rather than detecting the nose area by considering all species. Thereafter, step S320 of performing a quality check to check whether the detected image of the nose area is suitable for future identification or learning of a nose print may be performed, and then when the detected image is determined to be a suitable image as a result of the quality check, step S325 of transmitting the image to a server, so as to use the detected image for identification or to store the detected image for the future learning or identification may be performed.

In addition, according to the present disclosure, in step S330, a camera may be controlled to focus on the detected nose area, so that the image of the object for identification of the companion animal, such as the dog's nose creases (i.e., the nose print), is not photographed blurry. This is to enable the camera to focus on the nose area in order to prevent the image quality from being deteriorated due to the nose being out of focus.

FIG. 4A to 4E illustrate an example of User Interface (UI) screens, for obtaining a companion animal nose print image, to which the present disclosure is applied. FIGS. 4A to 4E illustrate a case for obtaining a nose print of a dog among various companion animals.

Figure 4A:
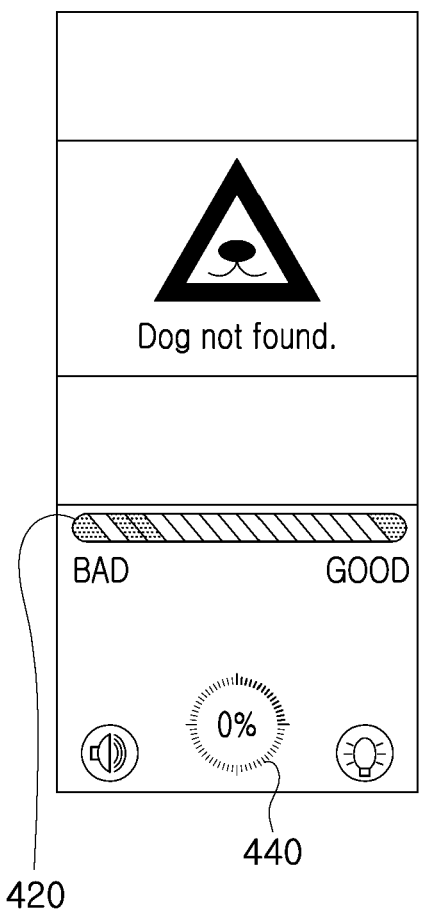
FIGS. 4A to 4E illustrate an example of User Interface (UI) screens, for detecting the object for the identification of the companion animal, to which the present disclosure is applied.
Figure 4B:
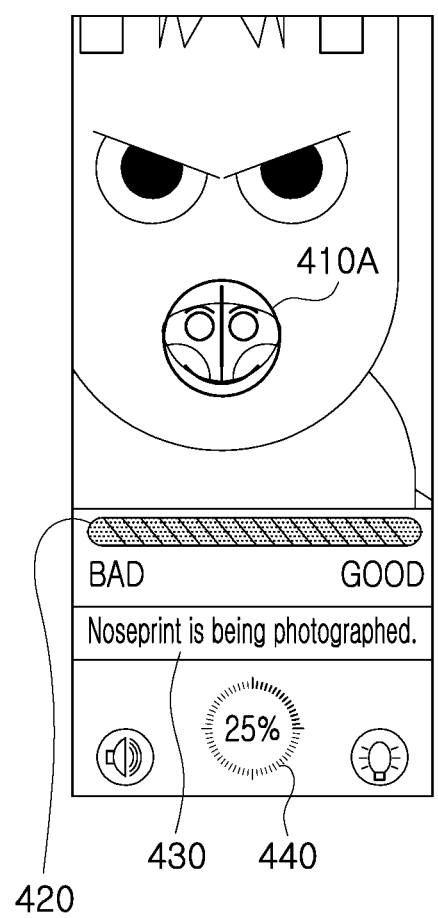

Referring to FIGS. 4A to 4E, it is determined whether the companion animal currently being photographed is the dog by identifying a species of the companion animal from the image being photographed. When the companion animal being photographed is not a dog, a phrase such as "Dog not found" is output as shown in FIG. 4A, and when the companion animal being photographed is the dog, the procedure to obtain a dog's nose print is performed. In order to determine whether the companion animal being photographed is the dog, a face area of the companion animal included in the image is first extracted, and an image included in the face area is compared with the existing learned data, whereby the species of the companion animal may be determined.

Thereafter, as shown in FIGS. 4B to 4E, after setting an area corresponding to the dog's nose on the dog's face, the photographing may be performed by focusing on the area corresponding to the nose. That is, the camera may be controlled to focus on a location (i.e., a central point) of the area corresponding to the object for the identification of the companion animal. In addition, graphic elements may be overlaid on the location of the object being tracked in order to provide feedback to a user that the currently tracked object (e.g., the nose) is being photographed with focus. By displaying the graphic element indicating a detection state of the corresponding object being tracked at the location of the object being tracked, the user may recognize that object recognition is being performed on the companion animal currently being photographed.

As shown in FIG. 4B to 4E, when the image quality of the object currently being photographed is good (i.e., the image quality of the object satisfies a reference condition), a first graphic element 410A (e.g., a smiley icon or a green icon) indicating a state of having a good quality may be overlaid on the object so as to be output. When the image quality of the object currently being photographed is poor (i.e., when the image quality of the object does not satisfy the reference condition), a second graphic element 410B (e.g., a crying icon or a red icon) indicating a state of having a poor quality may be overlaid on the object so as to be output.

As shown in FIGS. 4A to 4E, even when the dog is continuously moving, the photographing may be performed by focusing on the nose while tracking the dog's nose. In this case, it may be determined whether the image of the dog's nose print in each photographed image is suitable for the identification or learning of the companion animal, and a degree of suitability may be output.

For example, the degree of the suitability on whether the photographed image of the dog's nose print is suitable for the identification or learning of the companion animal may be calculated as a numerical value, and according to the numerical value for the suitability, score information 420 may be output in a form of filling a gauge in a "BAD" direction as the lower the suitability, and in a "GOOD" direction as the higher the suitability. That is, the score information 420 indicating the photograph quality of the object in the image may be output.

Figure 4C:
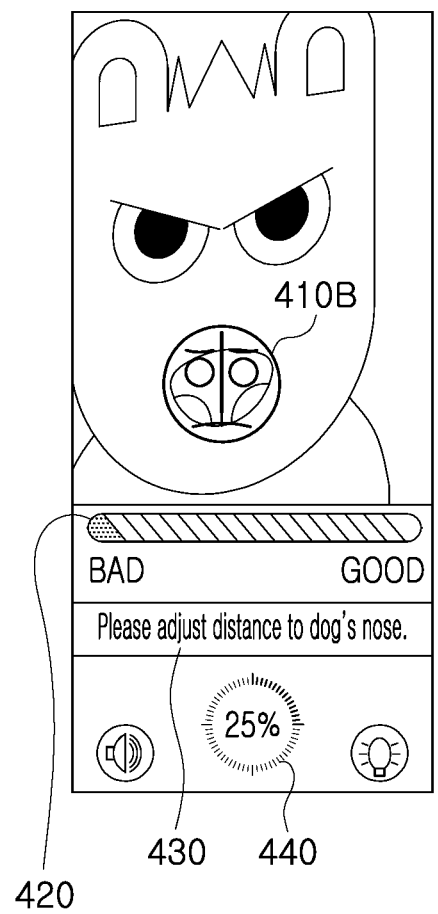
Figure 4D:
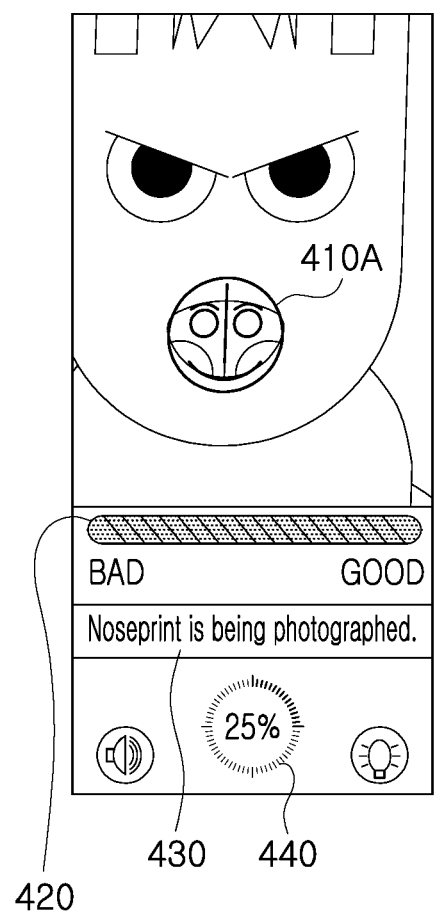
Figure 4E:
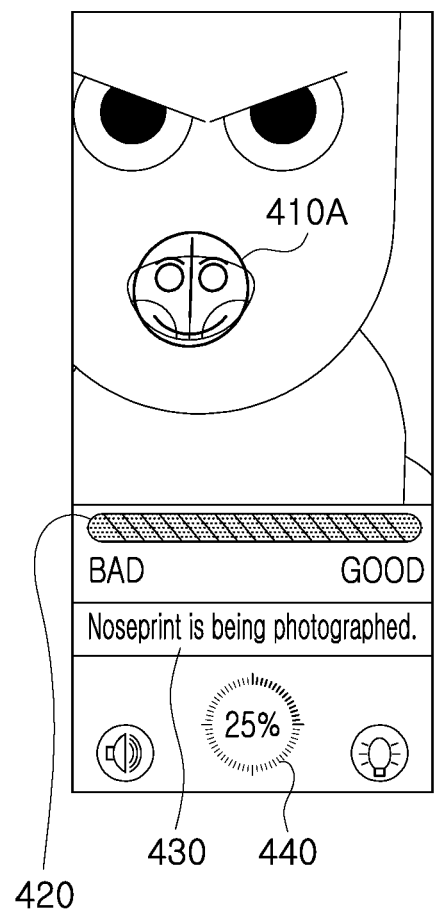

In addition, by performing quality evaluation (on a size, brightness, sharpness, etc.) on the image of the nose print currently being photographed, a user may be provided with feedback so that a nose print image suitable for artificial intelligence-based identification or learning is photographed. As the user feedback, a message 430 informing the user to properly photograph the object of the companion animal may be output. For example, when the size of a dog's nose print image is smaller than the reference value, a message such as "Please adjust a distance to the dog's nose" may be output as shown in FIG. 4C so that a larger size of the nose print image is photographed. In the process of photographing the object (e.g., the dog's nose print) for the identification of the companion animal, a voice message (e.g., "Please adjust a distance to the dog's nose") may be output to the user through a speaker as the feedback informing the user so that the image is properly photographed. Alternatively, a haptic module may provide the feedback to the user by generating vibration so that the object for the identification of the companion animal may be properly photographed. For example, when a distance from a camera 1010 to a companion animal is too far away or too close, the haptic module may generate vibration so that a proper distance may be set for the user.

In addition, progress rate information 440 indicating a degree of progress in obtaining an object image having a suitable quality for the identification of a companion animal may be output. For example, when five nose print images having a suitable quality are required and one suitable image has been obtained, the progress rate information 440 indicating that a progress rate is 25% may be output as shown in FIGS. 4A to 4E.

When the nose print images of the dog are sufficiently obtained, the photographing may end, and the identification information may be stored together with the nose print images of the corresponding dog in the database or the identification information of the corresponding dog may be output.

In the present disclosure, the face area of the companion animal is first detected, and then the nose area is detected within the face area. This is to reduce the difficulty of object detection while reducing computational complexity. In the process of photographing an image, a thing other than an object to be detected or unnecessary or erroneous information may be included in the image. Accordingly, the embodiment of the present disclosure first determines whether a desired object (i.e., the nose of a companion animal) exists in the image being photographed.

In addition, an image having a resolution higher than a predetermined level is required to identify a nose print of a companion animal, but as the resolution of the image increases, there is a problem that the amount of computation for image processing increases. In addition, as the types of companion animals increase, there is a problem that computational difficulty of artificial intelligence further increases because learning methods are different for respective types of the companion animals. In particular, since animals of similar types have similar shapes (e.g., a dog's nose and a wolf's nose are similar), classifying noses with the animal types for similar animals may have a very high computational difficulty.

Accordingly, the present disclosure uses a cascaded object detection method in order to reduce such computational complexity. For example, while photographing a companion animal, a face area of the companion animal is detected first before the type of the companion animal is identified, and then a nose area of the corresponding companion animal is detected on the basis of the detected face area of the companion animal and the identified type of the companion animal. In this way, a process of identifying the type of the companion animal is first performed at low resolution with relatively low computational complexity, and then the object detection method determined according to the type of the companion animal is applied, so that the nose area detection is performed while maintaining high resolution in the face area of the companion animal. Thus, the present disclosure may effectively detect the nose area of the companion animal while relatively reducing computational complexity.

Figure 5:
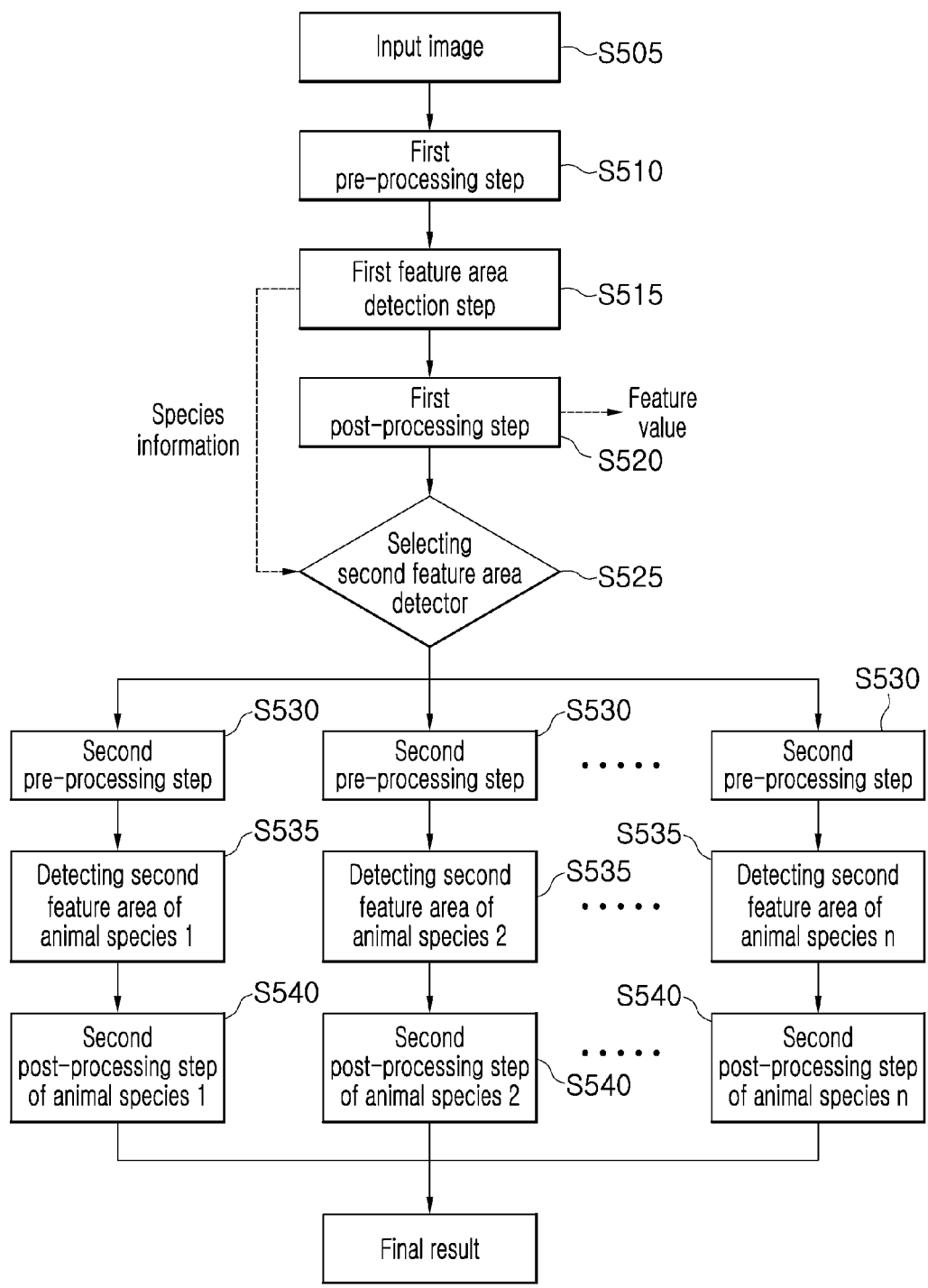
FIG. 5 illustrates a process of detecting the object for the identification of the companion animal according to the present disclosure.

FIG. 5 illustrates an overall image processing process for the identification of a companion animal according to the present disclosure. As shown FIG. 5, the method of processing an input image according to the present disclosure includes: step S505 of receiving the input image from a camera; step S510 of first pre-processing, wherein a first processed image is generated by adjusting a size of the input image; step S515 of detecting a first feature area, wherein a location of an animal and a species of the animal are detected from the processed image generated in the first pre-processing step; step S520 of first post-processing, wherein a first feature value of the animal image is extracted from a result of the detecting of the first feature area; step S525 of determining a detector for detecting an object (e.g., a nose) for the identification of the companion animal according to the species of the companion animal in the image processed through the first post-processing step; step S530 of second pre-processing, wherein the size of the image is adjusted for image processing for the identification of the companion animal; step S535 of detecting at least one second feature area corresponding to each of the species of the animals detectable in the detecting of the first feature area; and step S540 of second post-processing, wherein a second feature value of the animal image is extracted corresponding to each of the detecting of the second feature area.

First Pre-Processing Step

Step S510 of applying the first pre-processing to an original image is a step of converting an image into a form suitable for object detection by adjusting a size, a ratio, a direction, and the like of the original image.

With the development of camera technology, an input image is mostly composed of millions to tens of millions of pixels, and it is not preferable to directly process such a large image. In order for the object detection to work efficiently, pre-processing should be performed so that an input image is suitable for processing. This process is mathematically performed through coordinate system transformation.

It is apparent that an arbitrary processed image may be generated by matching four arbitrary points in an input image to four vertices of the processed image and performing an arbitrary coordinate system transformation process. However, when an arbitrary nonlinear transformation function is used in the coordinate system transformation process, inverse transformation should be performable to obtain a feature area of the input image from a bounding box obtained as a result of the feature area detector. For example, when affine transformation that linearly transforms the four arbitrary points of the input image by corresponding to the four vertices of the processed image is used, the inverse transformation process may be easily obtained, so it is preferable to use the affine transformation.

As an example of a method of determining four arbitrary points in an input image, a method of using four vertices of the input image as it may be considered. Alternatively, a method of adding a blank space to the input image or cutting out a part of the input image may be used so that horizontal and vertical lengths may be transformed at the same ratio. Alternatively, various interpolation methods may be applied in order to reduce the size of the input image.

First Feature Area Detection Step

An objective of the present step is to set a first feature area that may be used in a second feature area detection step to be described later by first detecting a species of the animal and an area in which a companion animal exists in a pre-processed image, and also the objective is to increase final feature point detection performance by selecting a second feature area detector optimized for the species of each companion animal.

Whichever object detection and classification method in the present process may be easily combined by those skilled in the art. However, since a method based on an artificial neural network is known to have superior performance compared to a conventional method, it is preferable to use a feature detection technique based on the artificial neural network as much as possible. For example, a feature detector of a single-shot multibox detection (SSD) method, which is an algorithm for detecting objects of various sizes with respect to one image, may be used in the artificial neural network.

The input image normalized according to the preprocessor described above is hierarchically configured from a first feature image to an n-th feature image by the artificial neural network. In this case, a method of extracting a feature image for each layer may be mechanically learned in a learning step of the artificial neural network.

The hierarchical feature image extracted in this way is combined with a list of predefined priori boxes corresponding to respective layers to generate lists of bounding boxes, object types, and confidence values. Such a computational process may also be mechanically learned in the learning step of the artificial neural network. For example, the result is returned in a format shown in Table 1 below. In this case, the number of species that may be determined by the neural network is determined in a neural network design step, and a case in which an object does not exist implicitly, that is, a "background" is defined.

TABLE 1

| Bounding Box | Background Probability | Species 1 Probability | Species 2 Probability | ... | Species n Probability |
|---|---|---|---|---|---|
| [0.2, 0.2]-[0.3, 0.3] | 0.95 | 0.01 | 0.02 | | 0.00 |
| [0.3, 0.3]-[0.4, 0.4] | 0.05 | 0.90 | 0.01 | | 0.00 |
| ... | | | | | |
| [0.9, 0.9]-[1.0, 1.0] | 0.00 | 0.01 | 0.00 | | 0.99 |

Figure 6:
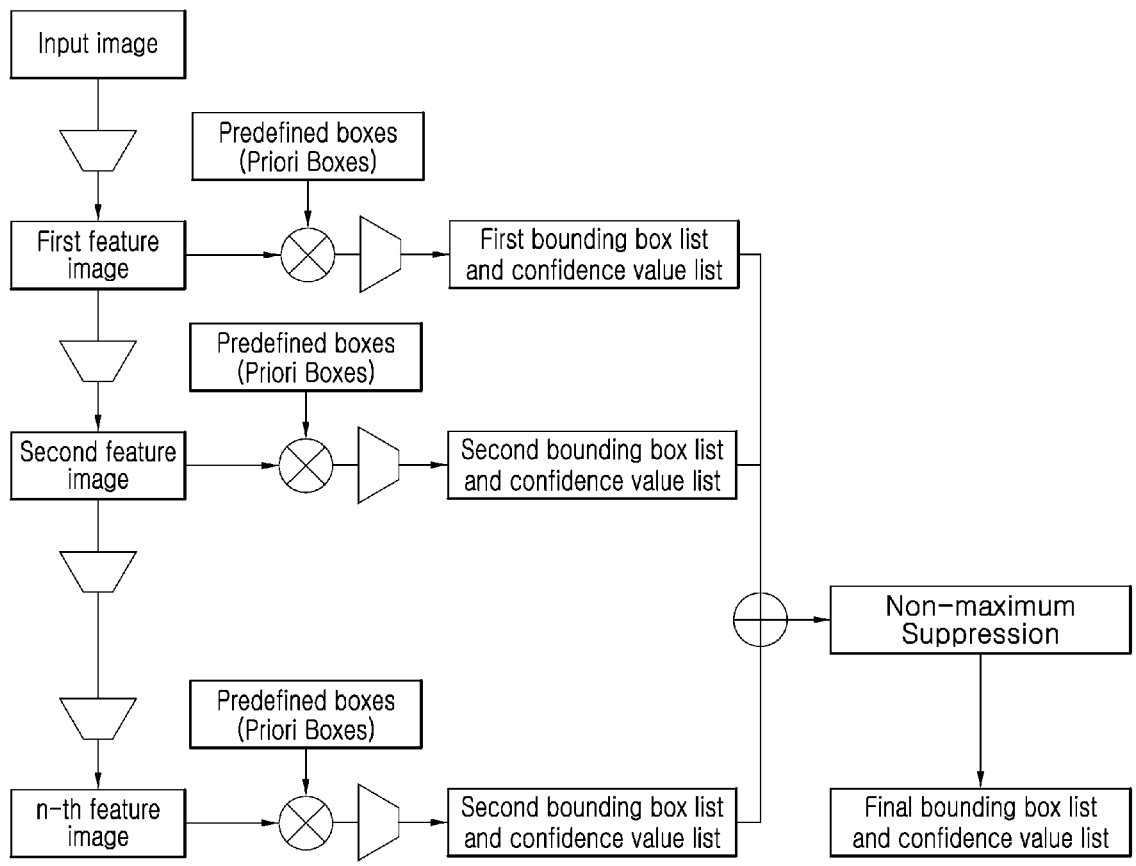
FIG. 6 illustrates a process of setting feature areas according to the present disclosure.

Such a result box is finally returned as a result of detecting an object existing in the image by merging the overlapping result boxes through a Non-Maximum Suppression (NMS) step. NMS is a process of deriving a final feature area from a plurality of feature area candidates, and the feature area candidates may be generated in consideration of the probability values shown in Table 1 according to such a procedure shown in FIG. 6.

This process will be described in detail as follows.
1. For each species except for a background, each following process is performed.
   A. From a bounding box list, a box whose probability of being a corresponding species is lower than a specific threshold is excluded. When there are no boxes left, the process is finished with no results.

B. In the bounding box list, a box whose probability of being the corresponding species is highest is designated as a first box (i.e., a first bounding area), and is excluded from the bounding box list.

C. For the rest of the bounding box list, each of the following processes is performed in the order of the highest probability.

i. An area ratio of Intersection over Union with the first box is calculated ii. When a value of the Intersection over Union (IoU) is higher than a specific threshold, this box is a box overlapping the first box. This box is merged with the first box.

D. The first box is added to a result box list.

E. When there are still boxes in the bounding box list, the process is iterated from step C again for the remaining boxes.

For two boxes A and B, an area ratio of Intersection Over Union may be effectively calculated as in Equation 1 below.

$$IoU = \frac{\text{Area}(A \cap B)}{\text{Area}(A \cup B)} = \frac{\text{Area}(A \cap B)}{\text{Area}(A) + \text{Area}(B) - \text{Area}(A \cap B)} \quad \text{[Equation 1]}$$

A method of merging the box overlapping the first box in the above process will be described as follows. For example, in Hard NMS, merging may be performed in such a way that the first box is maintained as it is and a second box is deleted from the bounding box list. Alternatively, in Soft NMS, merging is performed in such a way that the first box is maintained as it is, a value of probability in which the second box is a particular species is reduced by a weight value between (0, 1), and the second box is only deleted from the bounding box list when an attenuated result value is smaller than a specific threshold.

Finally, it is natural that a feature area in an original image may be obtained by performing an inverse transformation on one or a plurality of bounding boxes determined in this way with respect to an arbitrary transformation process used in the pre-processing step. Depending on configurations, a second detection step, which will be described later, may be adjusted to be well performed by adding a predetermined amount of blank space to the feature area in the original image.

First Post-processing Step

The first feature value may be generated by performing an additional post-processing step for each feature area of the input image obtained in step S515 for setting the first feature area described above. For example, in order to obtain brightness information (i.e., the first feature value) of the first feature area of the input image, an operation as in Equation 2 below may be performed.

$$L_{x,y} = 0.299 \cdot R_{x,y} + 0.587 \cdot G_{x,y} + 0.114 \cdot B_{x,y} \quad \text{[Equation 2]}$$

$$L = \frac{1}{MN} \sum_{(x,y) \in (M,N)} L_{x,y}$$

$$V_{x,y} = \text{Max}(R_{x,y}, G_{x,y}, B_{x,y})$$

$$V = \frac{1}{MN} \sum_{(x,y) \in (M,N)} V_{x,y}$$

In this case, L is a Luma value according to the BT. 601 standard, and V is a brightness value defined in a HSV color space. M and N are respectively a horizontal width and a vertical height of a target feature area.

By using the additionally generated first feature value in this way, whether the first feature area obtained in step S515 of detecting the first feature area is suitable for use in an application field combined with the present patent may be predicted. It is apparent that the additionally generated first feature value should be properly designed according to the application field. When a first feature value condition defined in the application field is not satisfied, a system may be configured to selectively omit a second feature area setting and object detection step, which will be described later.

Second Feature Area Detection Step

An objective of the present step is to extract a feature area specifically required in an application field from an area where an animal exists. For example, in the application field that detects locations of eyes, a nose, a mouth, and ears in an animal's face area, an objective of the application field is to first distinguish an animal face area and animal species information in the first feature area detection step and to detect the locations of the eyes, nose, mouth, and ears according to the animal species in the second feature area detection step.

In this process, the second feature area detection step may be composed of a plurality of independent feature area detectors specialized for each animal species. For example, when dogs, cats, and hamsters are distinguishable in the first feature area detection step, it is preferable to design three second feature area detectors to be respectively specialized for the dogs, cats, and hamsters. In this way, it is apparent that learning complexity may be reduced by reducing the types of features to be learned by the individual feature area detector, and in terms of learning data collection as well, neural network learning is executable even with a smaller number of pieces of data.

Since each of the second feature area detectors is configured independently of each other, those skilled in the art may easily configure an independent individual detector. Preferably, each feature area detector is individually configured to correspond with feature information to be detected in each species. Alternatively, in order to reduce the complexity of the system configuration, some or all of the second feature area detectors may share the feature area detectors having the same structure, but by replacing learning parameter values, a method of configuring the system suitable for each species may be used. Furthermore, a feature area detector having the same structure as that of the first feature area detection step may be used as the second feature area detector, but a method, replacing only the learning parameter values and NMS method, of further reducing the system complexity may be considered.

For one or a plurality of feature areas that is set through the first feature area detection step and the first post-processing step, it is determined that which second feature area detector will be used by applying the information of the species detected in the first feature area detection step, and then a second feature area detection step is performed by using the determined second feature area detector.

First, a pre-processing process is performed. In this case, in a process of transforming coordinates, it is apparent that a transformation process capable of performing inverse transformation should be used. In the second pre-processing process, since the first feature area detected in the input image should be transformed into an input image of the second feature area detector, it is preferable to define four points, which are necessary for designing a transformation function, as four vertices of the first feature area.

Since the second feature area obtained through the second feature area detector is a value detected by using the first feature area, the first feature area should be considered when the second feature area is calculated within the entire input image.

For the second feature area obtained through the second feature area detector, a second feature value may be generated by performing an additional post-processing step similar to the first post-processing step. For example, a Sobel filter may be applied to obtain the sharpness of the image, or information such as the posture of an animal to be detected may be obtained by using detection confirmation or relative locational relationship between feature regions.

By using the additionally generated second feature value in this way, whether the feature area obtained in the second object detection step is suitable for use in an application field combined with the present patent may be predicted. It is apparent that the additionally generated first feature value should be properly designed according to the application field. When the condition of the second feature value defined in the application field is not satisfied, it is preferable to conduct a design such as excluding not only the first detection area but also the second detection area from the detection result, so as to obtain data suitable for the application field.

System Expansion

The present disclosure provides an example of the system and configuration method thereof, wherein by configuring two-step detection step, the first feature location detection step detects a location and a species of an animal, and according to this result, a detector is selected to be used in the second feature location detection step.

Such a cascade configuration may be easily extended to a multi-layer cascade configuration. For example, application configuration may be possible in such a way that the whole body of an animal is detected in the first feature location detection step, a face location and a limb location of the animal are detected in the second feature location detection step, and the locations of the eyes, nose, mouth, and ears in the face are detected in the third feature location detection step.

By using such a multi-layer cascade configuration, the design may be easily conducted for a system capable of obtaining feature locations in multiple layers at the same time. When the number of layers is to be determined in designing a multi-layer cascaded system, it is apparent that optimal hierarchical structure may be designed, only after considering a hierarchical domain of feature locations to be obtained, operating time and complexity of the entire system, and resources required to construct each individual feature area detector.

A process of variably adjusting a focal location in order to obtain a high-quality object image for the identification of a companion animal (e.g., a nose print image) will be described. Although technologies to adjust a focus according to a location of an object is largely applied to a general smartphone, such technologies mainly target the object that does not move during a photographing time, such as a person. When a companion animal is photographed, there many cases that the object for identification (e.g., the nose) is often out of focus due to continuous movement of the companion animal. When the object for identification is not focused, data not suitable for artificial intelligence-based learning or identification is easily generated, so it would be preferable to bring the object for the identification of the companion animal into focus.

Accordingly, the present disclosure provides a method of continuously setting a focal location to a location of an object in accordance with the location of the detected object after a companion animal is detected as the object.

According to the present disclosure, an image including a companion animal is obtained and an area (i.e., a first feature area, e.g., a face area) for determining a species of the companion animal is set, so as to extract an image from the first feature area. Thereafter, an area (i.e., a second feature area, e.g., a nose area) for identifying the companion animal is set in the first feature area according to the species of the companion animal, and whether an image (e.g., a nose print image) in the second feature area is suitable for the artificial intelligence-based learning or identification is checked. When the image of the object in the second feature area has a quality suitable for the learning or identification, the image is transmitted to and stored in a neural network (e.g., a server) for the learning or identification, and when the quality is not suitable, the corresponding image is discarded.

Thereafter, when an image of an (N+1)-th frame is photographed, a camera is adjusted so that a focus is located on a location of an object detected in an N-th frame, whereby the object image (i.e., the nose print image) for the identification of the companion animal may be obtained so as to be suitable for the artificial intelligence-based learning or identification.

Figure 7:
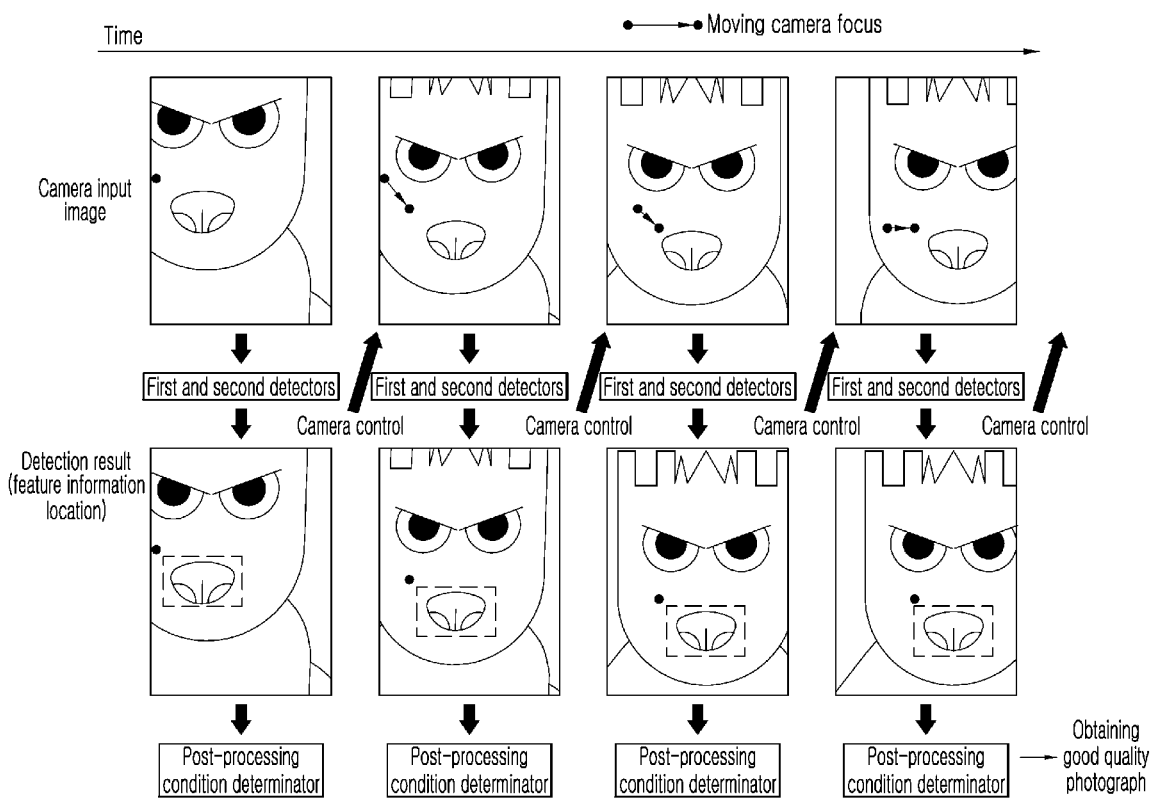
FIG. 7 illustrates a process of photographing the object for the identification of the companion animal by adjusting a focal location according to the present disclosure.

FIG. 7 illustrates a process of photographing the object for the identification of the companion animal by adjusting the focal location according to the present disclosure. Referring to FIG. 7, an object (e.g., the nose) for the identification of a companion animal is continuously tracked while photographing the companion animal, and a location of a focus for photographing the companion animal in a specific frame is set to an object location that is set in the previous frame. According to the present disclosure, the cascaded object detection is performed for each frame. As described with reference to FIG. 5, firstly, a first feature area is set to determine a species of an animal, and secondly, a second feature area in which an object (e.g., the nose) for identification is located within the first feature area is derived in consideration of the species of the animal. When the object detection is completed, post-processing (i.e., second post-processing) is performed to determine whether the image of the corresponding frame is suitable for learning or identification, and when a suitable image is obtained, the image of the corresponding frame is stored for later learning or identification.

In order to obtain an object image (e.g., a nose print image) for the identification of the companion animal, image photographing of the next frame is continued, where a location of a focus during the photographing is the location of the object determined in the previous frame. By changing the location of the focus according to the location of the object detected in the previous frame, even when the companion animal is not still and moves, the focus may be continuously moved along the object for identification. Through such a process, the possibility of out of focus may be reduced and a high-quality object image may be obtained. Through such a repeated process and movement of the camera focus, the possibility of obtaining the object image more suitable for the learning or identification may be increased.

Figure 8:
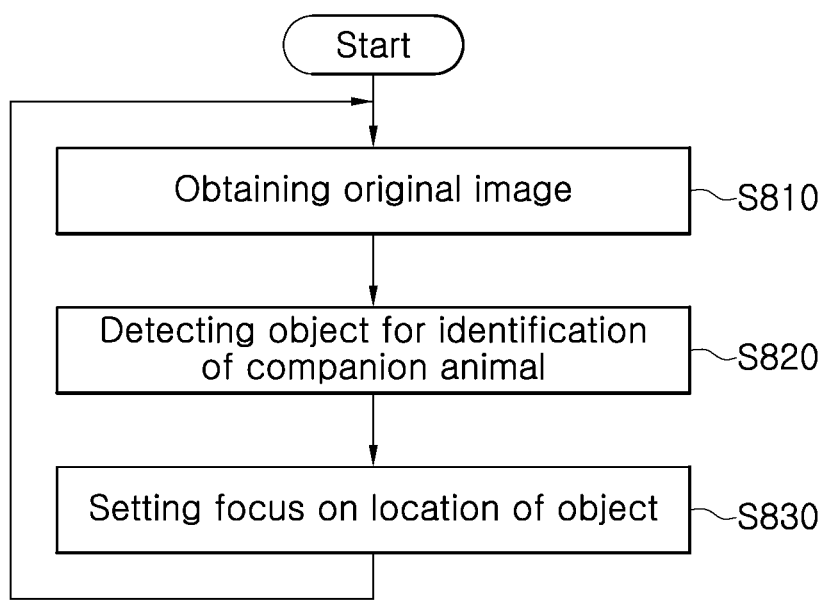
FIGS. 8 and 9 are respective flowcharts of a method of photographing the object for the identification of the companion animal according to the present disclosure.

FIG. 8 illustrates a method of photographing an object corresponding to the nose of a companion animal in the companion animal nose print management system according to the present disclosure.

The method for photographing the object for the identification of the companion animal according to the present disclosure includes: step S810 of obtaining an image including the companion animal; step S820 of detecting an object for the identification of the companion animal from the image; and step S830 of photographing a next image in a state in which a focus is set to a location of the detected object. Thereafter, object detection and focus location change for the next image (frame) may be iteratively performed.

According to the present disclosure, step S810 of obtaining the image including the companion animal may include: generating an image by photographing the companion animal in a state where the focus is set on the location of the object detected from the image photographed in the previous frame.

According to the present disclosure, step S830 of photographing the next image may include: detecting a changed location of the object in the next image; determining whether the image of the object whose location is changed in the next image is suitable for the artificial intelligence-based learning or identification; and performing next photographing in a state in which a focus is set to the changed location.

As shown in FIG. 7, the object for identification (e.g., the nose of a companion animal) may be detected with respect to an image of a current frame, and whether the image (i.e., the nose print image) of the corresponding object is suitable for the artificial intelligence-based learning or identification may be determined, and a location of the object detected from the image of the current frame may be set as a location of a focus when the image of a next frame is photographed. As in the present disclosure, the focus of the current frame is adjusted by referring to the location of the object in the previous frame, so that the focus may be maintained on the object for the identification of the companion animal and the image of the object (i.e., the nose print image) for the identification having a quality to the extent that the image is learnable or identifiable may be obtained.

According to the present disclosure, the detecting of the object for the identification of the companion animal from the image may include: setting a first feature area for determining the species of the companion animal in the image; and setting a second feature area including the object for the identification of the companion animal according to the species of the companion animal within the first feature area. In the present disclosure, instead of simultaneously detecting the species of the companion animal and the object for the identification of the companion animal from the image, species detection of the companion animal, which may be easily processed with low resolution, is first performed, and later the object for the identification of the companion animal is detected in consideration of the species of the companion animal, whereby the image for object identification (i.e., the nose print image) may be effectively obtained while reducing the computational complexity.

According to the present disclosure, the setting of the second feature area includes determining whether the image of the object (e.g., the nose print image) for the identification of the companion animal is suitable for the artificial intelligence-based learning or identification. Rather than storing all the images after photographing the companion animal, the process first determines whether the image of the object for the identification of the companion animal is suitable for the artificial intelligence-based learning or identification, and only proper object images are stored in a server or a neural network for learning or identification, so that unnecessary data may be prevented from being stored.

According to the present disclosure, the determining of whether the image of the object is suitable for the artificial intelligence-based learning or identification may include: determining whether the quality of the image of the object satisfies a reference condition; transmitting the image of the object to a server for learning or identification when the quality satisfies the reference condition; and discarding the image of the object and performing photographing for a next image when the quality does not satisfy the reference condition. The quality of the image of the object may be expressed as the first and second quality values described above, and when the first and second quality values are greater than the respective reference values, the corresponding image of the object may be determined to have the quality suitable for the learning or identification.

Figure 9:
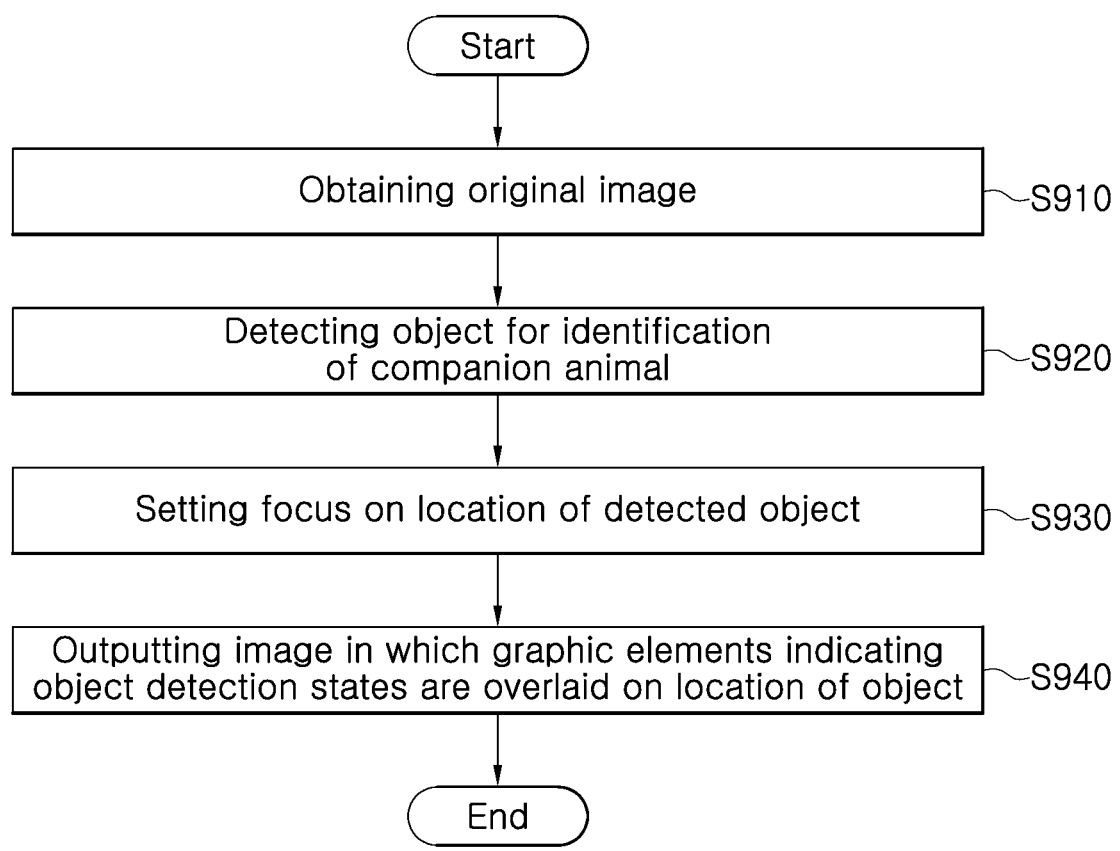

FIG. 9 illustrates a process of photographing an object for identifying a companion animal through object tracking according to the present disclosure. A method of photographing the object for identifying the companion animal according to the present disclosure includes: step S910 of obtaining an image including the companion animal; step S920 of detecting the object for the identification of the companion animal from the image; step S930 of setting a focus to a location of the object; and step S940 of outputting the image in which graphic elements indicating object detection states are overlaid on the location of the object on which the focus is set. For example, as shown in FIGS. 4A to 4E, the object (i.e., the nose) for the identification of the companion animal is detected in the image being photographed and the focus is set to the location of the object, and the graphic elements 410A and 410B may be overlaid to be output. By allowing the graphic elements to track the object detected for each frame, a user may recognize whether the object is correctly tracked, and may check whether an image quality of the object currently being photographed is proper.

According to the exemplary embodiment of the present disclosure, step S940 of outputting the image may include: determining whether the quality of the image of the object satisfies a reference condition; overlaying the first graphic element 410A, indicating a state of having a good quality, on the object when the quality of the image of the object satisfies the reference condition; and overlaying the second graphic element 410B, indicating a state of having a poor quality, on the object when the quality of the image of the object does not satisfy the reference condition.

According to the exemplary embodiment of the present disclosure, step S940 of outputting the image may include outputting score information 420 indicating a photographing quality state of the object in the image. As shown in FIGS. 4A to 4E, the degree of suitability on whether a photographed image of the dog's nose print is suitable for the identification or learning of the companion animal may be calculated as a numerical value, and according to the numerical value for the suitability, the score information 420 may be output in a form of filling a gauge in a "BAD" direction as the lower the suitability, and in a "GOOD" direction as the higher the suitability.

According to the exemplary embodiment of the present disclosure, the method of photographing the object for identifying the companion animal may further include providing feedback to a user so that a good quality object image may be photographed according to a quality state of the image of the object. The feedback may include one of a message output together with the image, a voice message output through a speaker, or haptic feedback output through vibration. For example, when a size of a dog's nose print image is smaller than a reference value, a message such as "Please adjust a distance to the dog's nose" may be output as shown in FIG. 4C so that a larger size of the nose print image is photographed. For example, in the process of photographing the object (e.g., the dog's nose print) for the identification of the companion animal, a voice message (e.g., "Please adjust a distance to the dog's nose") may be output to the user through the speaker as the feedback informing the user so that the image is properly photographed. Alternatively, a haptic module may provide the feedback to the user by generating vibration so that the object for the identification of the companion animal may be properly photographed. For example, when a distance from a camera 1010 to a companion animal is too far away or too close, the haptic module may generate the vibration so that a proper distance may be set for the user.

According to the exemplary embodiment of the present disclosure, in step 910 of obtaining an image including a companion animal may include: generating the image by photographing the companion animal in a state in which a focus is set on a location of an object detected from the image photographed in a previous frame.

Figure 10:
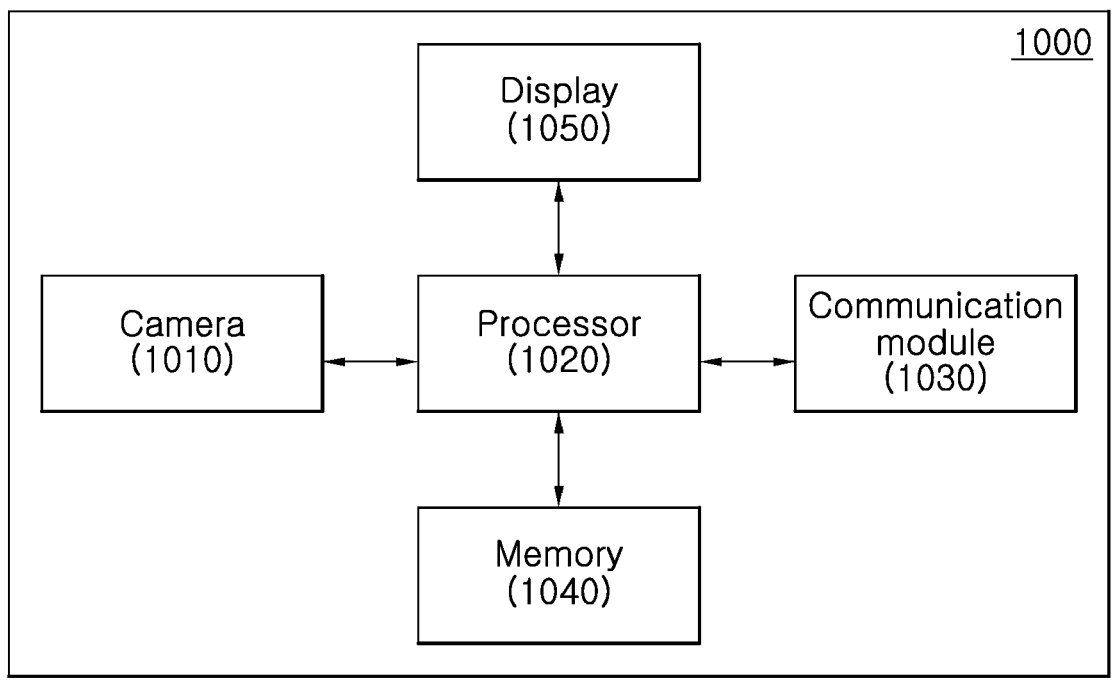
FIG. 10 is a block diagram of an electronic device according to the present disclosure.

FIG. 10 is a block diagram of an electronic device 1000 according to the present disclosure. The electronic device 1000 according to the present disclosure includes: a camera 1010 configured to generate an original image including a companion animal: and a processor 1020 configured to detect an object for identification of the companion animal from the image, and controlling the camera 1010 so as to photograph a next image in a state of setting a focus to a location of the detected object.

The camera 1010 may include: an optical module such as a lens; and a charge-coupled device (CCD) or complementary metal-oxide semiconductor (CMOS) that generates an image signal from input light, and may generate image data through image photographing to provide the image data to the processor 1020.

The processor 1020 controls each module of the electronic device 1000 and performs an operation necessary for image processing. The processor 1020 may be configured with a plurality of microprocessors (i.e., processing circuits) according to functions thereof. As described above, the processor 1020 may detect an object (e.g., a nose) for the identification of the companion animal (e.g., the dog) and perform validity determination of the image with respect to the corresponding object. For example, the processor 1020 may detect the object (e.g., the nose) for the identification of the companion animal in the photographed image, and adjust a lens distance of the camera 1010 to focus on the corresponding object. In addition, the processor 1020 may overlay and output graphic elements indicating that the location of the detected object is being tracked, or may output score information indicating a quality state of the object image and a message providing feedback to a user on a display 1050.

A communication module 1030 may transmit or receive data with an external entity through a wired/wireless network. In particular, the communication module 1030 may exchange the data for artificial intelligence-based processing through communication with a server for learning or identification.

Additionally, depending on the use, the electronic device 1000 may include various modules, including: a memory 1040 configured to store image data and information necessary for image processing; and a display 1050 configured to output a screen to a user. The display 1050 may output an image of a companion animal being photographed and an interface screen of the companion animal. In addition, although not shown, the electronic device 1000 may include: a speaker configured to output an acoustic signal; and a haptic module configured to provide haptic feedback to the user through vibration. For example, in the process of photographing the object (e.g., the dog's nose print) for the identification of a companion animal, a voice message (e.g., "Please adjust a distance to the dog's nose") may be output to the user through the speaker as the feedback informing the user so that the image is properly photographed. Alternatively, the haptic module may provide the feedback to the user by generating the vibration so that the object for the identification of the companion animal may be properly photographed. For example, when a distance from the camera 1010 to the companion animal is too far away or too close, the haptic module may generate the vibration so that a proper distance may be set for the user.

According to the present disclosure, the processor 1020 may control the camera 1010 so as to generate an image by photographing the companion animal in a state of setting the focus on the location of the object detected from the image photographed in the previous frame.

According to the present disclosure, the processor 1020 may control the camera 1010, so as to detect the changed location of the object in the next image, determine whether the image of the object whose location has been changed in the next image is suitable for the artificial intelligence-based learning or identification, and perform next photographing in the state in which the focus is set to the changed location.

According to the present disclosure, the processor 1020 may set the first feature area for determining the species of the companion animal in the image, and set the second feature area including the object for the identification of the companion animal within the first feature area.

According to the present disclosure, the processor 1020 may determine whether the image of the object for the identification of the companion animal is suitable for the artificial intelligence-based learning or identification.

According to the present disclosure, the processor 1020 may control the camera 1010, so as to determine whether the quality of the image of the object satisfies the reference condition, transmit the image of the object to the server for learning or identification when the quality satisfies the reference condition, and discard the image of the object and perform photographing for the next image when the quality does not satisfy the reference condition.

According to the present disclosure, the processor 1020 may output the image in which the graphic elements indicating the object detection states are overlaid on the location of the detected object on the display 1050.

According to the present disclosure, the processor 1020 may determine whether the quality of the image of the object satisfies the reference condition, overlay the first graphic element 410A indicating the good quality state on the object to output the object on the display 1050 when the quality of the image of the object satisfies the reference condition, and overlay the second graphic element 410B indicating the poor quality state on the object to output the object on the display 1050 when the quality of the image of the object does not satisfy the reference condition.

According to the present disclosure, the processor 1020 may output the score information 420 indicating the state of the photographing quality of the object in the image on the display 1050.

According to the present disclosure, the processor 1020 may output the message 430 providing the feedback to the user on the display 1050 so that the good quality object image may be photographed according to the quality state of the image of the object.

The present exemplary embodiment and the accompanying drawings in this specification only clearly show a part of the technical idea included in the present disclosure, and it will be apparent that all modifications and specific exemplary embodiments that can be easily inferred by those skilled in the art within the scope of the technical spirit contained in the specification and drawings of the present disclosure are included in the scope of the present disclosure.

Therefore, the spirit of the present disclosure should not be limited to the described exemplary embodiments, and all things equal or equivalent to the claims as well as the claims to be described later fall within the scope of the concept of the present disclosure.

The invention claimed is:

1. A method for photographing an object for identification of a companion animal, the method comprising:
    obtaining an image including the companion animal;
    detecting the object for the identification of the companion animal from the image;
    determining whether the image of the object for the identification of the companion animal is suitable for artificial intelligence-based learning or identification based on a quality of the image of the object;
    storing the image of the object when the image of the object is suitable for the artificial intelligence-based learning or identification; and
    photographing a next image in a state in which a focus is set to a location of the detected object.

2. The method of claim 1, wherein the obtaining of the image including the companion animal comprises:
    generating the image by photographing the companion animal in the state in which the focus is set on the location of the object detected from the image photographed in a previous frame.

3. The method of claim 1, wherein the detecting of the object for the identification of the companion animal from the image comprises:
    setting a first feature area for determining a species of the companion animal in the image; and
    setting a second feature area including the object for the identification of the companion animal according to the species of the companion animal within the first feature area.

4. The method of claim 1, wherein the determining of whether the image of the object is suitable for the artificial intelligence-based learning or identification comprises:
    determining whether the quality of the image of the object satisfies a reference condition;
    transmitting the image of the object to a server when the quality satisfies the reference condition; and
    discarding the image of the object and performing the photographing for the next image when the quality does not satisfy the reference condition.

5. A method for photographing an object for identification of a companion animal, the method comprising:
    obtaining an image including the companion animal;
    detecting the object for the identification of the companion animal from the image;
    setting a focus to the detected object; and
    outputting the image in which graphic elements indicating object detection states are overlaid on a location of the object on which the focus is set,
    wherein the outputting of the image comprises:
    determining whether a quality of the image of the object satisfies a reference condition;
    overlaying a first graphic element indicating a state of having a good quality on the object when the quality of the image of the object satisfies the reference condition; and
    overlaying a second graphic element indicating a state of having a poor quality on the object when the quality of the object does not satisfy the reference condition.

6. The method of claim 5, wherein the outputting of the image comprises:
    outputting score information indicating a photographing quality state of the object in the image.

7. The method of claim 5, further comprises:
    providing feedback to a user so as to enable a good quality object image to be photographed according to a quality state of the image of the object.

8. The method of claim 5, wherein the obtaining of the image including the companion animal comprises:
    generating the image by photographing the companion animal in a state in which the focus is set on the location of the object detected from the image photographed in a previous frame.

9. An electronic device for photographing an object for identification of a companion animal, the electronic device comprises:
    a camera configured to generate an original image including the companion animal; and
    a processor configured to:
    detect the object for the identification of the companion animal from the image;
    determine whether the image of the object for the identification of the companion animal is suitable for artificial intelligence-based learning or identification based on a quality of the image of the object;
    store the image of the object when the image of the object is suitable for the artificial intelligence-based learning or identification; and
    control the camera so as to photograph a next image in a state in which a focus is set on a location of the detected object.

10. The electronic device of claim 9, wherein the processor controls the camera, so as to generate the image by photographing the companion animal in the state in which the focus is set on the location of the object detected from the image photographed in a previous frame.

11. The electronic device of claim 9, wherein the processor sets a first feature area for determining a species of the companion animal in the image, and sets a second feature area including the object for the identification of the companion animal within the first feature area.

12. The electronic device of claim 9,
    wherein the processor determines whether the quality of the image of the object satisfies a reference condition, and controls the camera, so as to transmit the image of the object to a server when the quality satisfies the reference condition, and discard the image of the object and photograph the next image when the quality does not satisfy the reference condition.

13. The electronic device of claim 9, further comprising:
a display configured to output the image of the companion animal being photographed.

14. The electronic device of claim 13, wherein the processor outputs, on the display, the image in which graphic elements indicating object detection states are overlaid on the location of the detected object.

15. The electronic device of claim 14, wherein the processor determines whether the quality of the image of the object satisfies a reference condition, overlays a first graphic element indicating a state of having a good quality on the object when the quality of the image of the object satisfies the reference condition, and overlays a second graphic element indicating a state of having a poor quality on the object when the quality of the object does not satisfy the reference condition.

16. The electronic device of claim 13, wherein the processor outputs score information indicating a photographing quality state of the object in the image on the display.

17. The electronic device of claim 9, wherein the processor provides feedback to a user so as to enable a good quality object image to be photographed according to a quality state of the image of the object.

18. A method for photographing an object for identification of a companion animal, the method comprising:
obtaining an image including the companion animal using a camera;
detecting the object for the identification of the companion animal from the image;
storing the image of the object; and
photographing a next image in a state in which a focus of the camera is set to a location of the detected object of the image,
wherein the obtaining the image including the companion animal comprises generating the image by photographing the companion animal in the state in which the focus is set on the location of the object detected from an image photographed in a previous frame, and
wherein when an (N+1)-th frame is photographed, the focus of the camera is set on a location of an object for identifying the companion animal detected in an N-th frame.

* * * * *